United States Patent [19]
Shen

[11] Patent Number: 5,812,649
[45] Date of Patent: Sep. 22, 1998

[54] METHOD AND APPARATUS FOR SUPPORTING SPONTANEOUS CALL WAITING IDENTIFICATION

[75] Inventor: Anthony P. Shen, Ontario, Canada

[73] Assignee: Aastra Aerospace Inc., North York, Canada

[21] Appl. No.: 641,831

[22] Filed: May 2, 1996

[51] Int. Cl.[6] .............................. H04M 1/56; H04M 3/42; H04M 1/00

[52] U.S. Cl. ...................... 379/142; 379/215; 379/376; 455/415

[58] Field of Search ..................... 379/127, 142, 379/140, 141, 157, 179, 183, 188, 189, 199, 201, 215, 373, 374, 395, 376, 58, 59, 60, 61, 63; 370/259, 271; 455/414, 415, 462, 425

[56] References Cited

U.S. PATENT DOCUMENTS

| 4,551,581 | 11/1985 | Doughty. | |
|---|---|---|---|
| 4,873,719 | 10/1989 | Reese | 379/215 |
| 5,228,080 | 7/1993 | Nutter et al. | |
| 5,263,084 | 11/1993 | Chaput et al. | |
| 5,559,860 | 9/1996 | Mizikovsky | 379/375 |
| 5,581,599 | 12/1996 | Tsuji et al. | 379/61 |
| 5,583,924 | 12/1996 | Lewis | 379/215 |

OTHER PUBLICATIONS

National Assistive Device Center® Product Catalog, HITEC Group International, Inc., 1995.

*Primary Examiner*—Paul Loomis
*Attorney, Agent, or Firm*—Kilpatrick Stockton LLP

[57] ABSTRACT

A method and apparatus for allowing a conventional caller identification adjunct device to support spontaneous call waiting identification service. During an ongoing call, CPE alerting signals indicating a second, incoming call are received by a converter device which mutes a line to the connected telephone and responds with the appropriate DTMF signal. Following the correct response, the telephone company sends information in an FSK format which describes the number and name of a second caller. Upon receiving the FSK information, the converter adds the appropriate protocol information to the FSK information so that it can be understood by the CID display device. The modified information is then transferred to the CID display device where it is displayed.

26 Claims, 9 Drawing Sheets

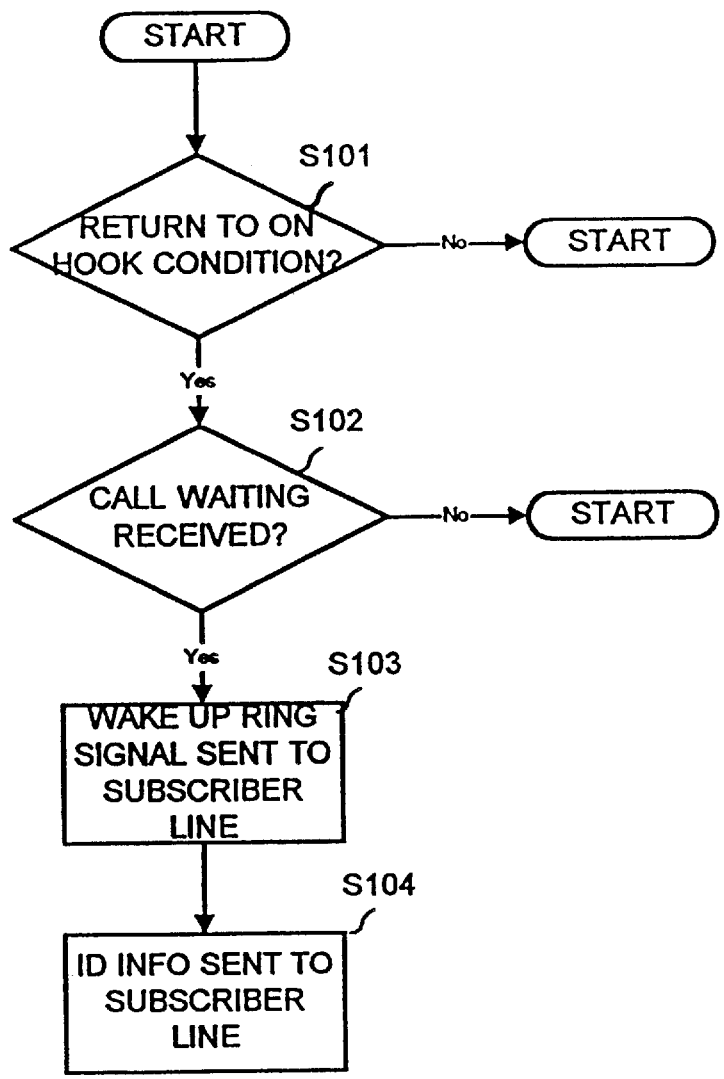

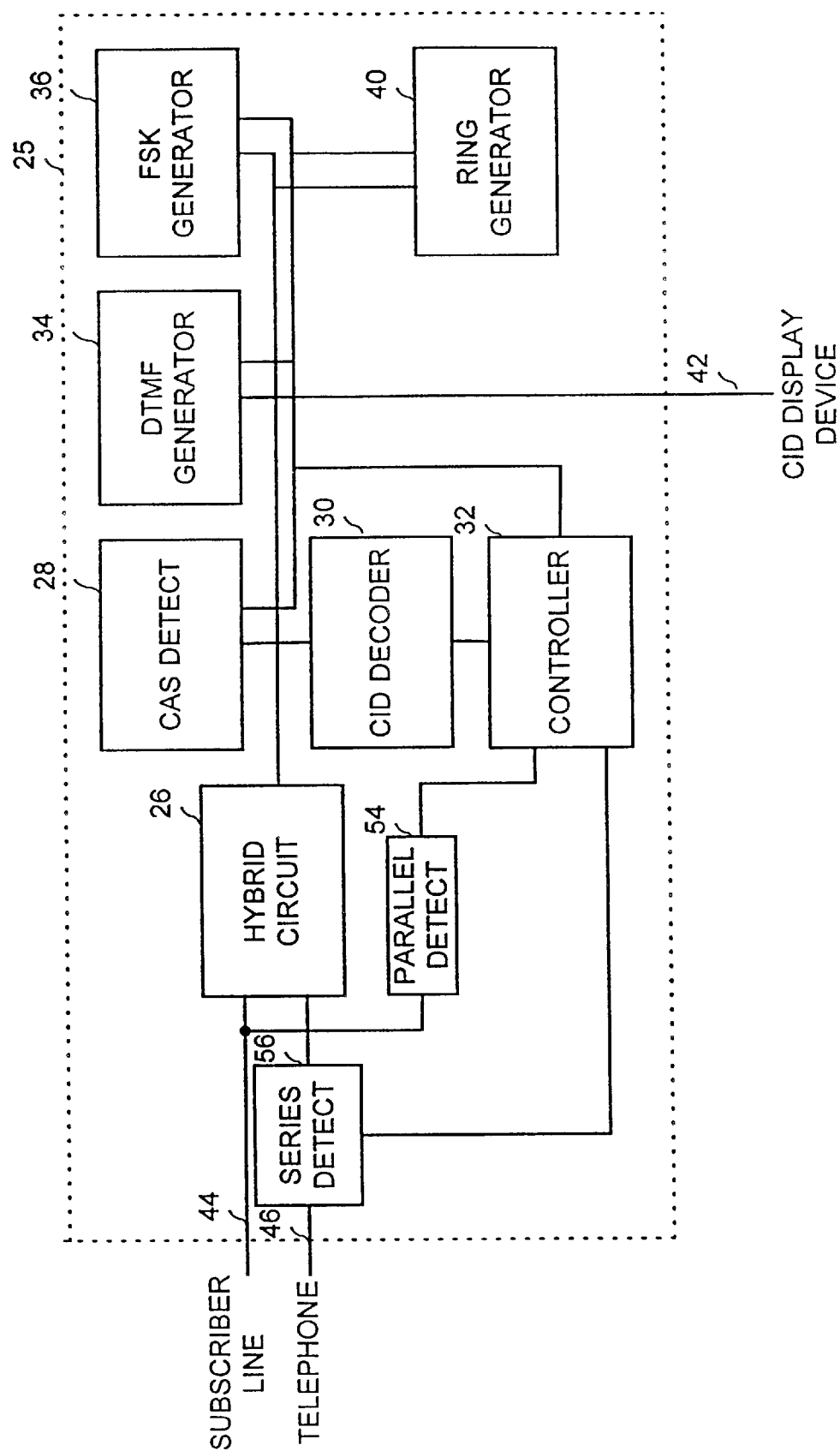

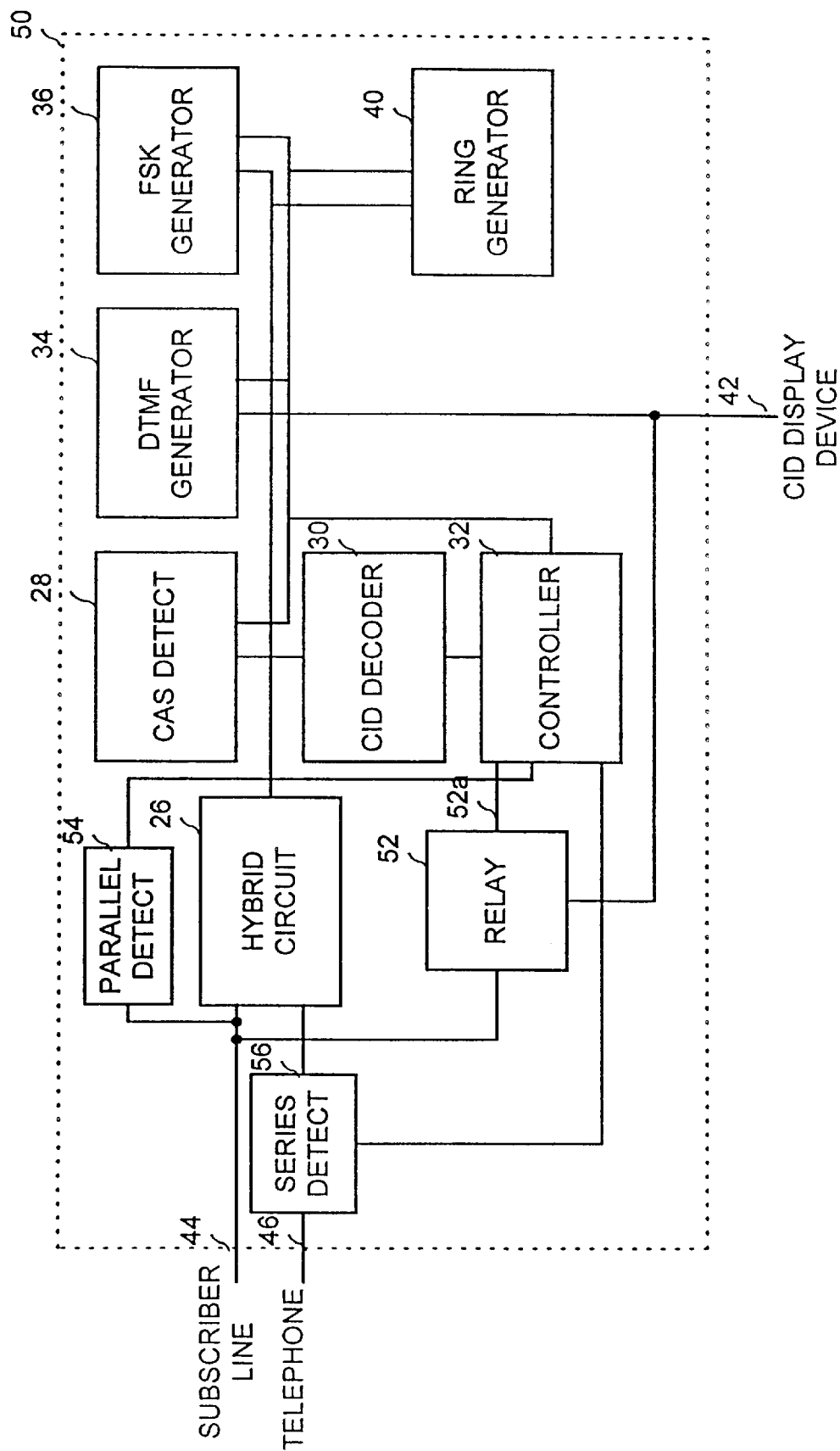

METHOD AND APPARATUS FOR SUPPORTING SPONTANEOUS CALL WAITING IDENTIFICATION

FIELD OF INVENTION

This invention relates to a device that allows a conventional caller identification (CID) adjunct device to support spontaneous call waiting identification (SCWID) service.

BACKGROUND OF THE INVENTION

Call waiting is a custom calling feature offered by most telephone companies, and can be subscribed to for a nominal monthly fee. With call waiting, a second call is announced by a soft "beep" produced by CPE alerting signal (CAS) that is transmitted by the telephone company. Upon hearing this beep, the subscriber normally asks a current caller to wait while the second call is answered. The second call is answered by generating a "flash" signal, typically by briefly depressing the hook switch of the telephone, thereby indicating that the handset is momentarily on-hook. At the conclusion of the second call, the subscriber is returned to the first caller.

Another popular feature is caller identification (CID) service. This service allows one to determine the number and name of an incoming calling party prior to answering the incoming call. Typically, this information is provided to a CID display device in a format that consists of 250 milliseconds of channel seizure (30 bytes of octal 125), 160 milliseconds of a conditioning signal (mark state), actual data, and finally, a checksum byte for verifying the validity of the transmission. The actual data may be provided in either a single data message format or the multiple data message format, as known in the art and as specified in Bellcore technical documents TR-NWT-000031 and TN-NWT-001188, the relevant disclosures of which are incorporated by reference herein.

CID is typically implemented with a separate adjunct unit which receives identification information in the format mentioned above and decodes this information so that the number and name of an incoming caller may be displayed. For example, Questra is a CID adjunct unit that is commercially available from Sprint North Supply. Alternatively, integrated telephone sets are available which incorporate the features of the adjunct unit.

Spontaneous call waiting identification (SCWID) is an enhancement to call waiting service and to CID which is currently available from many telephone companies. As with CID, SCWID is typically implemented with a separate device which displays the name and number of an incoming caller. This service permits one to receive the name and number of a second caller while one is previously engaged in a first telephone conversation, thereby allowing one to decide whether or not to interrupt the first conversation to take the second call.

U.S. Pat. No. 5,263,084 to Chaput et al. describes a device for implementing the SCWID feature. The disclosure of this patent is incorporated by reference herein. As described in this patent, the SCWID feature involves a central office which generates a tone during a call between a first party and a second party. The device described in the U.S. Pat. No. 5,263,084 patent detects this signal and responds by muting the handset and determining whether any extensions are in use so as to avoid any interference generated from an extension. If no extensions are in use, an acknowledgement message is sent to the central office and the receiving device prepares for a message that is sent by the central office in a protocol specified by Bellcore Technical References TR-TSY-00030 and TR-TSY-00031. As known in the art, these specifications utilize frequency shift keying (FSK) to transfer the identification information from the central office to the subscriber. The subscriber device translates the FSK data into a digital bit stream which is, in turn, decoded and displayed to the user.

While most SCWID display devices will work with both SCWID and CID services, conventional CID display units cannot be used to provide SCWID service. This is because such conventional CID display units are not configured to interpret the FSK format referred to above which is utilized to provide SCWID information. As a result, a conventional CID display unit must be replaced with a SCWID unit in order to make use of the SCWID service. This imposes an additional cost on the subscriber who already has purchased a conventional CID display unit.

SUMMARY OF THE INVENTION

It is an object of the invention to address the above described limitation and others by providing an add-on device that converts an existing conventional CID display device to be compatible with, and take advantage of SCWID service.

This object is achieved with a method and apparatus for allowing a conventional caller identification adjunct device to support spontaneous call waiting identification service. During an ongoing call, CPE alerting signals indicating a second, incoming call are received by a converter device which mutes a line to the connected telephone and responds with the appropriate DTMF signal. Following the correct response, the telephone company sends information in an FSK format which describes the number and name of a second caller. Upon receiving the FSK information, the converter adds the appropriate protocol information to the FSK information so that it can be understood by the CID display device. The modified information is then transferred to the CID display device where it is displayed.

According to one aspect of the invention, the converter buffers caller identification information that is received while the subscriber line is on-hook, and then provides this information to the CID display device. According to an alternate feature, a relay is utilized to directly route the received caller identification information to the CID display device when the subscriber line is on-hook.

According to another aspect of the invention, the converter stores caller identification information that is received while the subscriber line is engaged (off-hook). The stored caller identification information is then provided to other CID display devices connected in parallel along the subscriber line.

According to still another aspect of the invention, the converter utilizes two voltage detection circuits to determine more accurately the condition of the subscriber line. A first circuit, connected in parallel with the subscriber line, determines the voltage of the subscriber line. A second circuit, connected in series with a telephone extension (which is in series with the converter), determines the voltage of the line to the extension.

Other aspects and features of the invention are made apparent from the detailed description of the preferred embodiments set forth below.

BRIEF DESCRIPTION OF THE DRAWINGS

In the drawings:

FIG. 2B is a flow diagram illustrating a method of operation in accordance with the an alternative aspect of the invention;

FIG. 3 is a block diagram showing a SCWID converter according to a first embodiment of the invention;

FIG. 4 is a block diagram showing a SCWID converter according to a second embodiment of the invention.

DETAILED DESCRIPTION OF THE PREFERRED EMBODIMENTS

Figure 1:
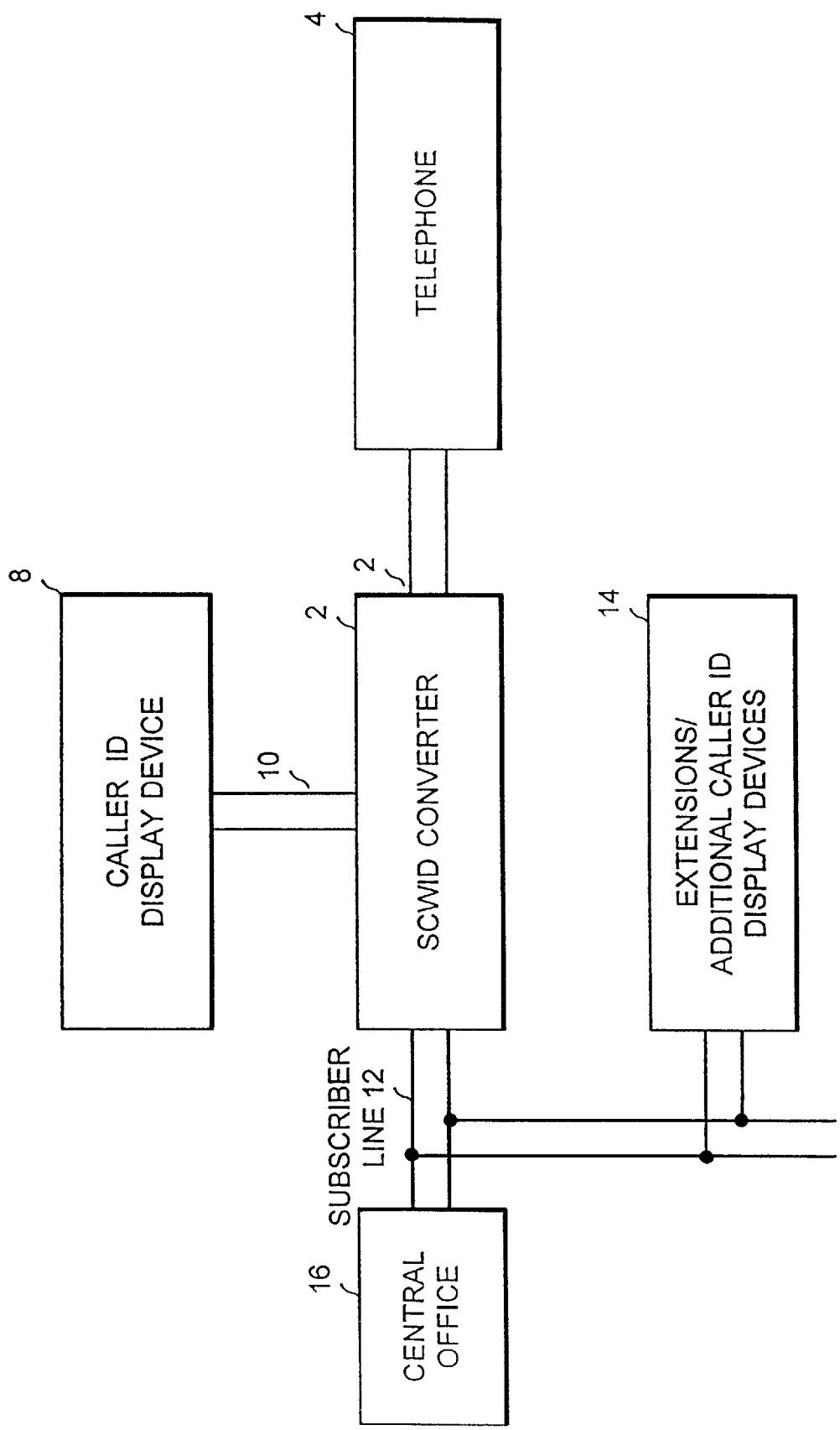
FIG. 1 is a block diagram of converter device according to the invention connected to a telephone, a CID display device and a telephone line.

FIG. 1 is a block diagram of a SCWID converter 2 in accordance with the invention as it would be utilized by a subscriber. The SCWID converter 2 is connected to a telephone 4 through a telephone line 6 and through a second telephone line 10 to a conventional device, generally designated as a caller identification (CID) display device 8. The CID display device may comprise, for example, any commercially available device which displays CID information, including adjunct devices or integrated telephone devices, but which is not configured to display identification information that is received in a frequency shift keyed format utilized in connection with SCWID services.

The SCWID converter 2 is additionally connected to a telephone line 12 that connects the subscriber telephone 4 to a central telephone office 16. The central office 16 may support various subscriber services, including SCWID services. Other extensions, generally designated by reference numeral 14, are connected in parallel to the SCWID converter 2. These extensions 14, may include other CID display devices. The telephone lines 6, 10 and 12 shown in FIG. 1 represent any standard transmission medium, such as twisted pair lines or equivalents thereof (including wireless transmission media). These lines are connected to the respective devices shown in FIG. 1 through techniques well known in the art.

Arranged as shown, the telephone 4 can be used to receive incoming calls and to place outgoing calls which are transmitted through lines 6 and 12 and the SCWID converter 2. As explained in greater detail below, the arrangement illustrated in FIG. 1 permits one to obtain identification information, such as the name and number of an incoming caller, whether or not the subscriber line 12 is previously engaged with a first call.

Figure 2A:
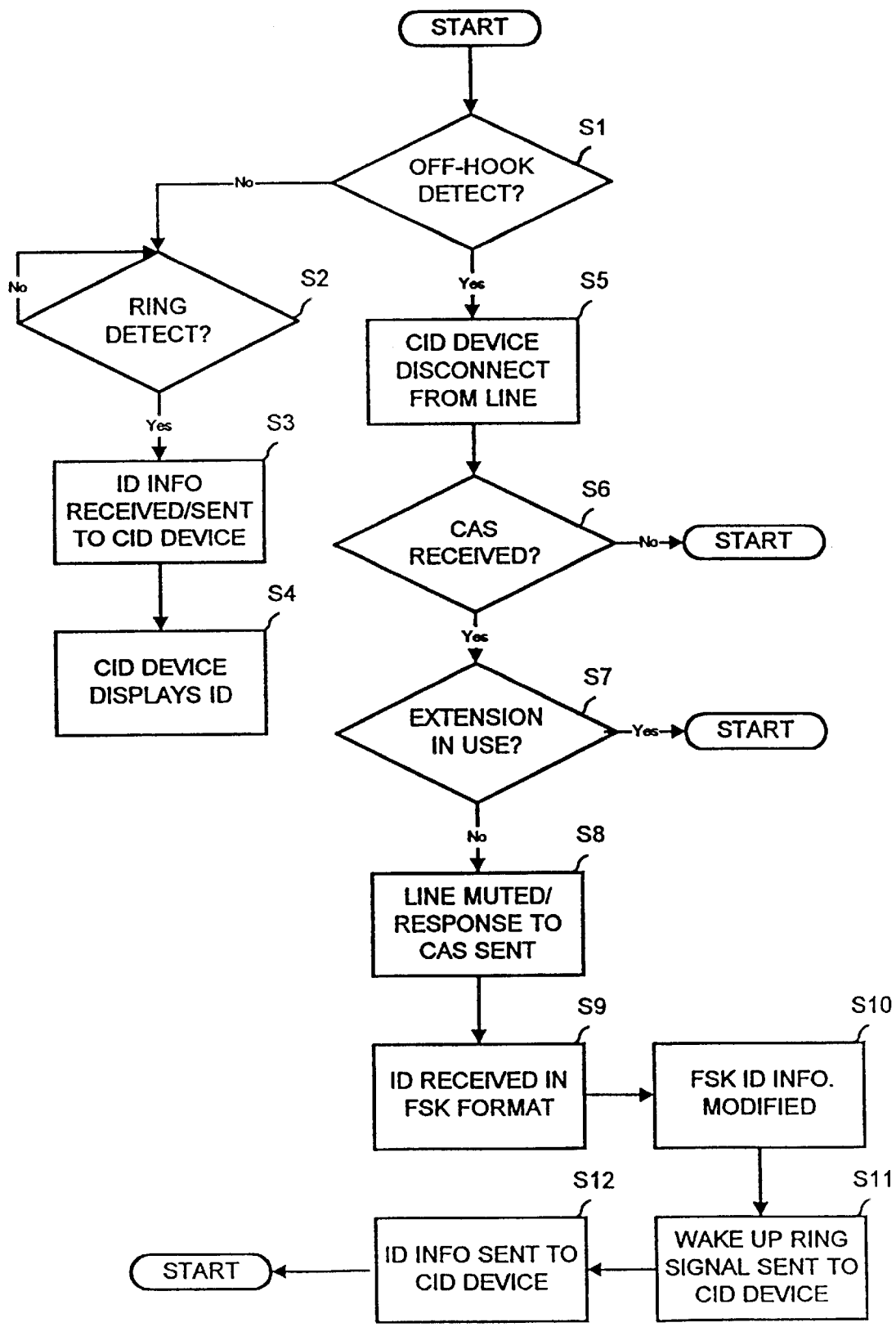
FIG. 2A is a flow diagram illustrating a method of operation in accordance with the invention.

FIG. 2A is a flow chart that illustrates a general operation of a SCWID converter arranged in the manner generally shown in FIG. 1. At an initial step S1, the SCWID converter 2 determines whether the subscriber line 12 to the central office is engaged, for example, as a result of a telephone 4 connected to the subscriber line being off-hook. When the telephone line 12 is not engaged (on-hook) and an incoming call causes the telephone 4 to ring (as shown in step S2), the SCWID converter 2 receives caller identification information and passes this information on to the CID display device 8 at a step S3. Then, at step S4, the CID display device 8 displays the name and number of the calling party based on this information in accordance with the standard implementation of CID service.

When the telephone line 12 is engaged (off-hook), for example, when a subscriber engages in a conversation using telephone 4, the CID display device 8 is disconnected at step S5 from the subscriber line 12 by the SCWID converter 2. If a second call comes in at this time, the service provider sends a call waiting signal (that is, a CAS) to the subscriber over line 12 at a step S6.

At this point, the SCWID converter 2 determines whether an extension connected to the subscriber line 12 is in use. If so, the CAS is ignored so as to avoid any interference with the identification signals provided by the central office. If no extension is found to be in use, at step S8, the SCWID converter 2 mutes the connected telephone 4 and responds to the CAS with an appropriate dual tone multiple frequency (DTMF) signal that is transmitted to the central office over the telephone line 12.

Upon receiving this response, at step S9 the central office transmits to the subscriber information describing the name and number of the second caller in a frequency shift key format in accordance, for example, with the specifications set forth in Bellcore Technical References TR-TSY-00030 and TR-TSY-00031. Once this information is buffered in temporary memory in the SCWID converter 2, appropriate protocol information is added to the FSK information received from the telephone company as shown in step S10 so that it may be recognized and decoded by a conventional CID display device.

The modified information is provided to the CID display device 8 at step S12 for display to the subscriber after an optional ring signal is sent to the CID display device 8 at a step S11. This optional step is commonly necessary in order to "wake up" the CID display device 8 so that it is placed in a mode in which it can receive caller identification information in the format provided by the SCWID converter.

In this manner, the subscriber can observe the identification information pertaining to the second, incoming call and decide whether or not to interrupt the first, ongoing call. This is achieved by use of a conventional CID display device rather than with a specialized display device configured for use with SCWID service.

FIG. 2B is a flow diagram showing an optional method by which stored caller identification information may be provided to any CID display devices connected to the subscriber line (reference 12 in FIG. 1) after the termination of a call. At step S101, it is determined whether the subscriber line has returned to an on-hook condition, for example, upon termination of a call. If so, it is determined at step S102 whether any caller identification information was received while the subscriber line was off-hook. If caller identification was received during this time, at a step S103, a ring signal is provided along the subscriber line to wake up any CID display devices connected thereto (such as those generally designated in FIG. 1 by reference numeral 14). Once the ring signal has been sent, the caller identification information that is stored in memory by the SCWID converter is provided to the subscriber line so that it may be displayed by any CID display devices connected to the line.

FIG. 3 is a block diagram which shows in greater detail a SCWID converter 25 according to a first embodiment of the invention. The SCWID converter 25 is connected to a telephone subscriber line 44 which connects with a central office in the manner described above. The SCWID converter 25 is additionally connected to a second line 46 to a telephone and to a third line 42 to a conventional CID display device.

The overall operation of the SCWID converter 25 is controlled by a controller 32. This component may comprise a microprocessor having associated nonvolatile memory and volatile memory (random access memory) for temporary storage of various information, such as the FSK SCWID information that is received from the central office. With this structure, the controller 32 is programmed to execute the operation illustrated in FIGS. 2A and 2B in conjunction with the other circuitry shown generally in FIG. 3.

The SCWID converter 25 includes a hybrid circuit 26 which serves essentially as a balancing circuit. The hybrid circuit 26 is connected to both the subscriber line 44 to the central office and to the line 46 to the subscriber's telephone. The hybrid circuit 26 effectively reduces the signal created by the telephone connected to line 46, but allows the signals from the central office to be provided to the SCWID converter 25. Through this circuit, voice transmission signals are exchanged between the telephone line 46 and the subscriber line 44. Further, identification information can be received from the subscriber line 44 and modified as required before being provided to the line 42 to the CID display device.

As illustrated in FIG. 3, a serial off-hook detection circuit 56 is provided to determine whether the telephone connected to line 46 has gone off-hook. For example, this circuit may comprises an opto-coupler or equivalent device that turns on due to current flow generated from the telephone going off-hook. This results in a signal being provided from the series detect circuit 56 to the controller 32.

A parallel detection circuit 54 is provided to detect whether the subscriber 44 has been engaged. For example, this circuit may include a comparator to determine when an off-hook condition arises, which may indicate that an extension is in use. For instance, a reference level of 18 VDC may be set in the comparator to determine that an off-hook event has occurred when the detected line voltage goes below this level.

Using the parallel detection circuit 54 and the serial off-hook detection circuit 56, the controller 32 can determine when the telephone attached to line 46 goes off-hook. The combined values of these circuits may be recorded in memory and refreshed as often as the event occurs. Based on the inputs from these detection circuits, voltage changes due to other extension telephones or devices may be detected. That is, if an extension device is engaged, the voltage combination from the detection circuits 54 and 56 will differ significantly from the reference voltages. Of course, other configurations may be used to determine the on-hook or off-hook condition of the subscriber line.

The SCWID converter 25 further includes a CAS detection circuit 28, CID decoder circuit 30, a DTMF generator circuit 34, an FSK generator circuit 36, and a ring generator circuit 40, each of which operates under command of the controller 32. When the telephone line 46 is not engaged (that is, when the subscriber line 44 is maintained in an on-hook state), incoming calls are received by the SCWID converter 25. CID information is transmitted by the telephone company through the subscriber line 44 and is decoded from the FSK data stream included therein by the CID decoder 30. The decoded identification signals are sent as digital data to the controller 32 where they are stored in a buffer associated therewith as is known in the art. The controller 32 then commands the ring generator 40 to send a wake-up ring signal to the CID display device.

Within a second after a wake-up ring signal is sent over the line 42, the controller 32 commands the FSK generator 36 to send the CID information received from the telephone company to the line 42 to the CID display device in a format which is compatible with the CID display device. The CID display device receives this information and displays the number and name of the calling party.

The format for the information provided to the CID display device consists of 250 milliseconds of channel seizure (30 bytes of octal 125), 160 milliseconds of a conditioning signal (mark state), actual data, and finally, a checksum byte for verifying the validity of the transmission. The actual data may be provided in either a single data message format or the multiple data message format, as known in the art and as specified in Bellcore technical documents TR-NWT-000031 and TN-NWT-001188.

According to a feature of the invention, the SCWID converter 25 also responds to visual message waiting indicator signals sent by the telephone company in either the single data message format or the multiple data message format as specified in Bellcore technical document TR-NWT-001401. These visual message waiting signals are also decoded and then stored in a buffer in the controller 32. The ring generator 40 produces a standard ring pulse in accordance with Bellcore signaling specification 6.1 to wake up the CID display device. The FSK generator 36 then sends the buffered visual message waiting signals to the CID display device to allow it to respond.

On the other hand, when the subscriber line is engaged (for example, when the subscriber is in the midst of a conversation) and a second call is received, a CAS signal sent by the telephone company is detected by the CAS detect circuit 28. The CAS detect circuit 28 indicates to the controller 32 that a CAS signal has been received.

Before acknowledging the CAS signal, the SCWID converter 25 determines if an extension is in use on the basis of the signals provided to the controller 32 from the parallel detection circuit 54 and the serial detection circuit 56. If an extension is in use, the SCWID converter does not acknowledge the alerting signal. If no extension is in use, the converter disconnects the subscriber line 44 from the line to the telephone 46, and then acknowledges the CAS within 100 milliseconds with a DTMF signal produced, in this example, by the DTMF generator 34 (that is, a DTMF signal at 941 Hz and 1633 Hz). Of course, it will be recognized that this signal may be produced by other means, such as with the controller 32.

After this acknowledgement signal is received by the telephone company, the telephone company sends the CID data in an FSK format. The CID data is received by the SCWID converter 25, decoded by the CID decoder 30 and then buffered in the controller 32. Within 50 milliseconds thereafter, the subscriber line 44 is reconnected with the line 46 to the telephone, thereby reestablishing the first call. The ring generator 40 then produces a standard ringing pulse that is provided to the line 42 to wake up the CID display device connected thereto. The decoded CID information is then sent from the controller 32 to the CID display device. Since the decoded CID information is received by the CID display device in a format which the CID display device can understand, this information can then be displayed to the subscriber.

It should be appreciated that with such a structure it is possible to provide SCWID service with a conventional CID display device. Thus, additional expenses associated with replacing a conventional CID display device with a SCWID display are avoided.

FIG. 4 illustrates a second embodiment of the invention in which identical elements are designated with the same reference characters as used in FIG. 3. In this example, a switching relay 52 is provided within a modified SCWID converter 50 between the subscriber line 44 and the line 42 to the CID display device. The relay 52 is selectively opened and closed in response to a signal received from the controller 32 over control line 52a.

With this arrangement, when a CAS signal is detected, the controller 32 verifies whether the subscriber line 44 is engaged. If engaged, the SCWID converter 50 device functions in the manner described above. If the subscriber line 44 is not engaged, the SCWID converter 50 receives CID information from the telephone company. However, rather than decoding, buffering and then transferring this data to the CID display device as described above, the controller 32 closes the relay 52, thereby providing the CID information directly to the CID display device. Since this information is in a format corresponding to that used with standard CID service, the information is recognizable by the CID display device. Thus, there is no need to decode, buffer and transfer the CID data with the CID decoder 30 and the controller 32 unless the subscriber line is engaged.

FIGS. 5A to 5E comprise a partial schematic diagram of a SCWID converter, such as that generally described in reference to FIG. 4. As appropriate, circuitry which contributes to the functionality described above is designated with the corresponding reference characters as used in FIG. 4.

Figure 5A:
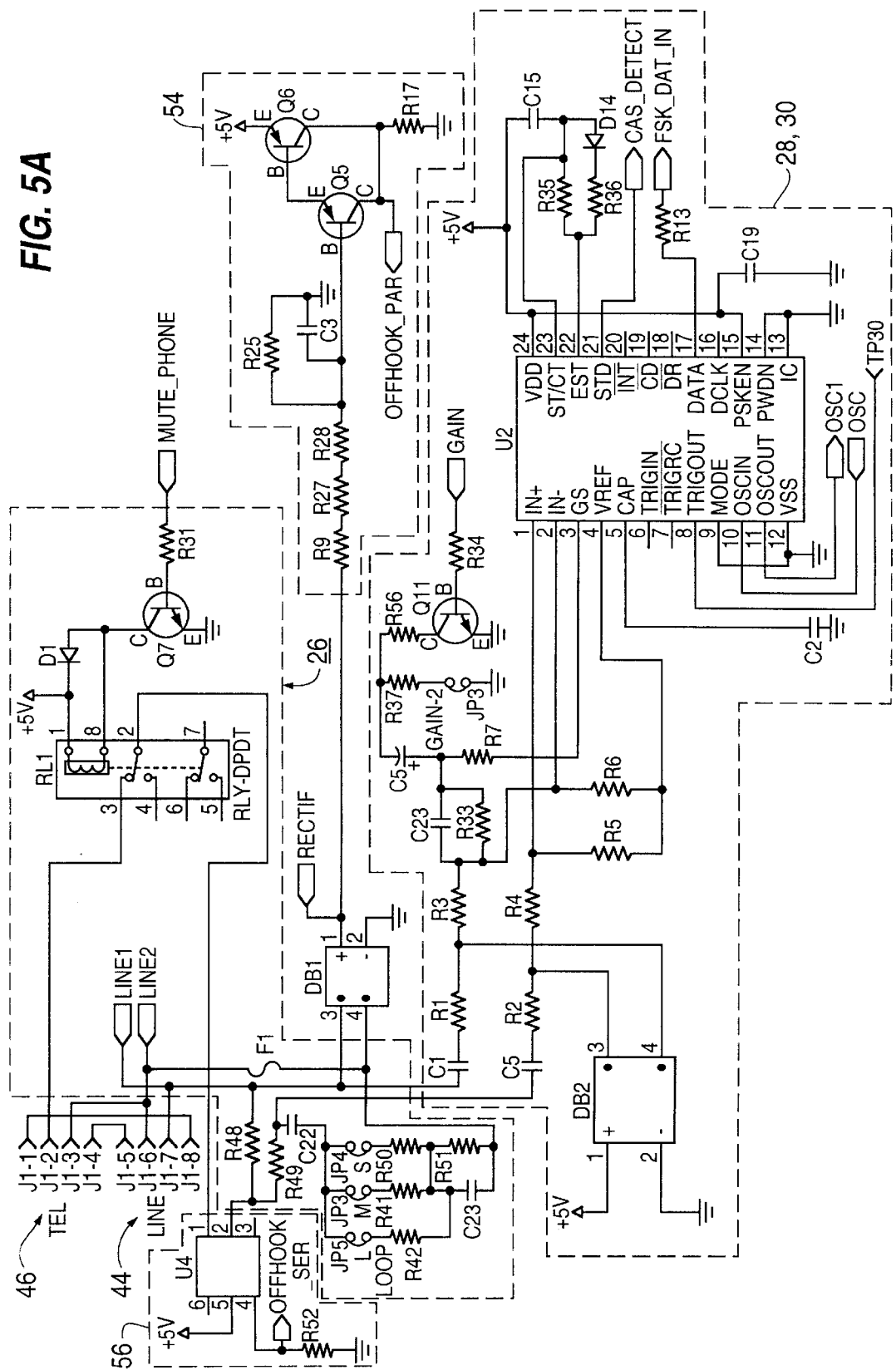
FIGS. 5A to 5E comprise a schematic diagram of a SCWID converter according to the invention.

FIG. 5A shows an example that includes, in large part, the hybrid circuit 26, the CAS detection circuit 28, the CID decoder circuit 30, the parallel detection circuit 54 and the series detection circuit 56. The telephone line 46 and the subscriber line 44 are provided to a relay RL1. The relay RL1 selectively opens and closes the signal path between lines 44 and 46 in response to a MUTE_PHONE signal that is input to transistor Q7 via base resistor R31. Depending on the state of this signal, the signal path from the subscriber line 44 and the telephone line 46 is opened and closed.

An optocoupler device U4 receives the signal from the relay RL1 at a first input and generates a logical off-hook detection signal OFFHOOK_SER by means of resistor R52 and a bias voltage of +5V. The signal path is supplied to the remaining elements of the hybrid circuit 26. These elements include resistors R41, R42, R48, R49, R50 and R51, capacitors C22 and C23, and jumper blocks JP4, JP5, and JP6 arranged as shown.

The parallel detection circuit 54 detects the voltage on the subscriber line via a diode bridge rectifier DB1. The rectified signal from this element is input via resistors R9, R27, and R28, and the RC filter comprising resistor R35 and capacitor C23 to the input of a transistor Q5. The emitter of the transistor Q5 is coupled to the base of a transistor Q6. A resistor R17 connects the collector of each transistor Q5 and Q6 to ground. A signal OFFHOOK_PAR is provided from the collector of the transistors and provided to the comparator circuit illustrated in FIG. 5B.

Figure 5B:
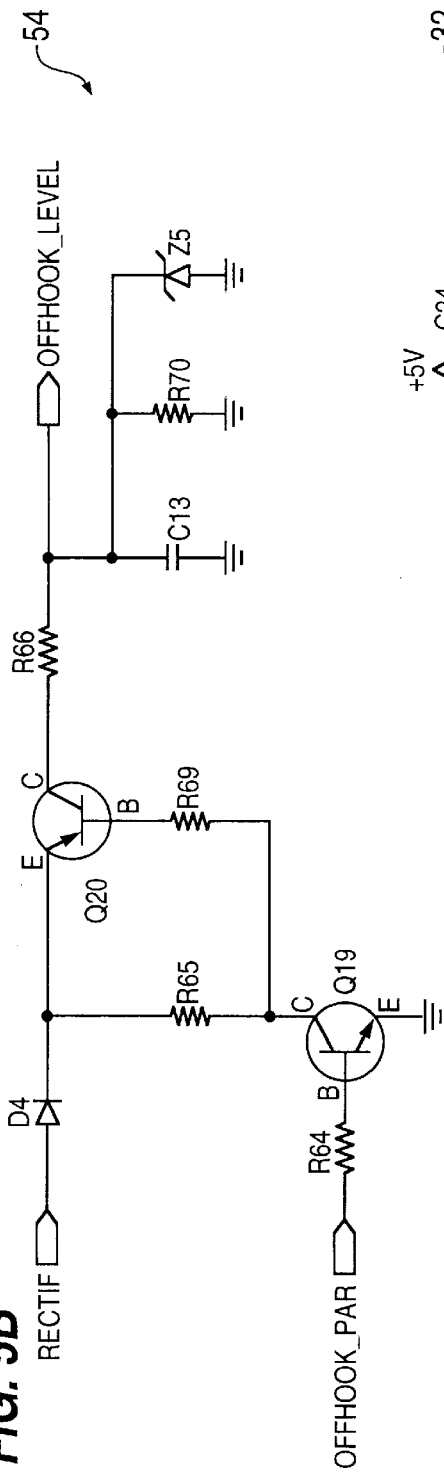

As shown in FIG. 5B, the OFFHOOK_PAR signal is compared with a rectified signal RECTIF to obtain a signal OFFHOOK_LEVEL that indicates when an extension is in use (that is, the telephone line 46 is off-hook). The comparator circuit includes resistors R64, R65, R68, R69, and R70, transistors Q19 and Q20, diode D4, zener diode Z5, and capacitor C13 arranged as shown.

Referring again to FIG. 5A, the signal path is further provided to circuitry which combines to function as the above-descried CAS detection circuit 28 and CID decoder circuit 30. A gain adjustment circuit GAIN-2 is utilized to adjust the input of the signal into integrated circuit U2, which in this example, may comprise a MITEL SNIC circuit, part no. MT8843. The gain circuit operates on the basis of a signal GAIN provided from the controller 32. The GAIN-2 circuit comprises resistors R7, R34, R37, and R56, a capacitor C9, a transistor Q11, and jumper block JP3, from which a signal is provided to input GS of the integrated circuit U2.

The balanced signal from the hybrid circuit 26 is provided to inputs IN+ and IN− of the integrated circuit U2 via resistors R1, R2, R3, R5, R6, and R33, capacitors C1, C6, and C28, and a diode bridge DB2. Based on this signal, the integrated circuit U2 provides a CAS_DETECT output to the controller as well as an FSK_DAT_IN output via a resistor R13.

Figure 5C:
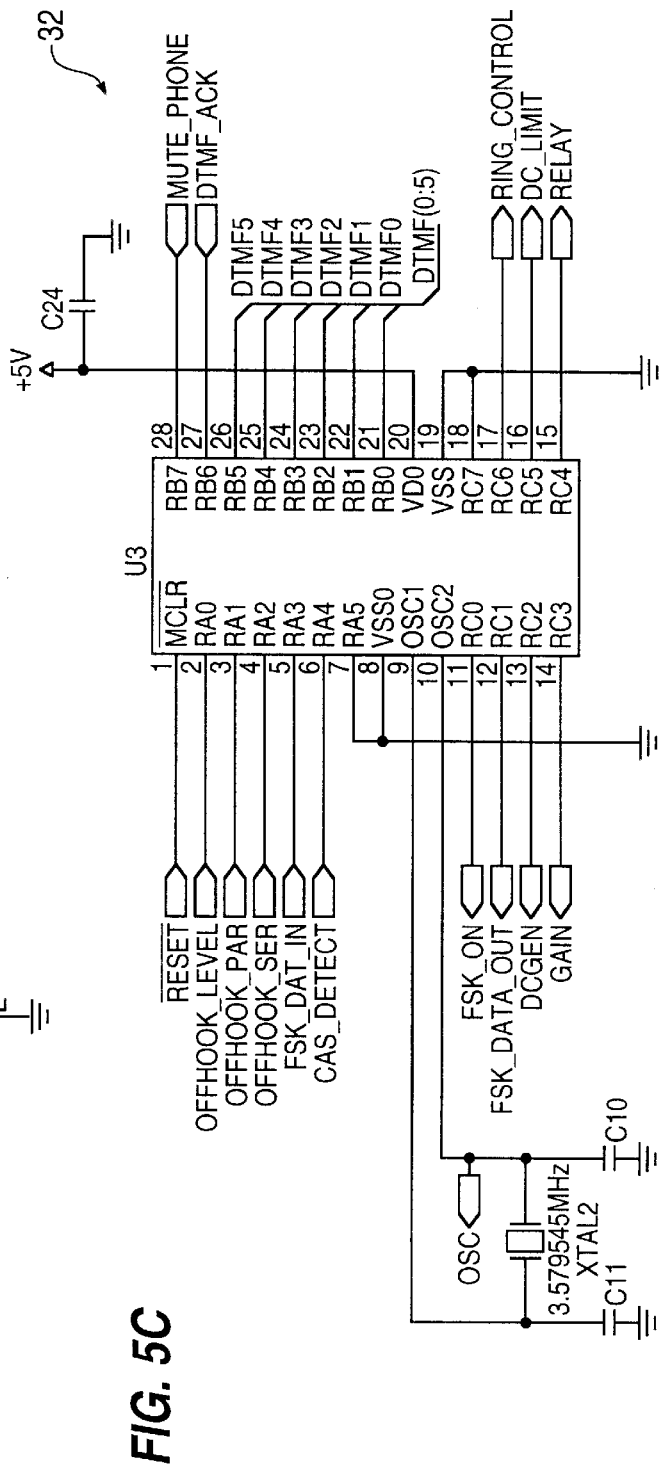

FIG. 5C illustrates a controller 32. In this example, a PIC microcontroller U3, such at PIC16C73-X by Microchip is utilized to control the operation of the circuit shown generally in FIG. 4. The microcontroller U3 receives as inputs a RESET signal, an OFFHOOK_LEVEL signal, the OFFHOOK_PAR signal, the OFFHOOK_SER signal, the FSK_DAT IN, and the CAS_DETECT signal. Programmed in accordance with the above described method, the microcontroller U3 outputs in parallel a six bit DTMF signal. It also supplies the MUTE_PHONE signal (to the hybrid circuitry 26), a DTMF_ACK signal, a RING_CONTROL signal, a DC_LIMIT signal, a RELAY signal, an FSK_ON signal, an FSK_DATA_OUT, a DCGEN signal, and the above described GAIN signal. The microcontroller's timing is based on a 3.579545 MHz crystal clock signal generator XTAL2 which is coupled to ground by capacitors C11 and C10.

Figure 5D:
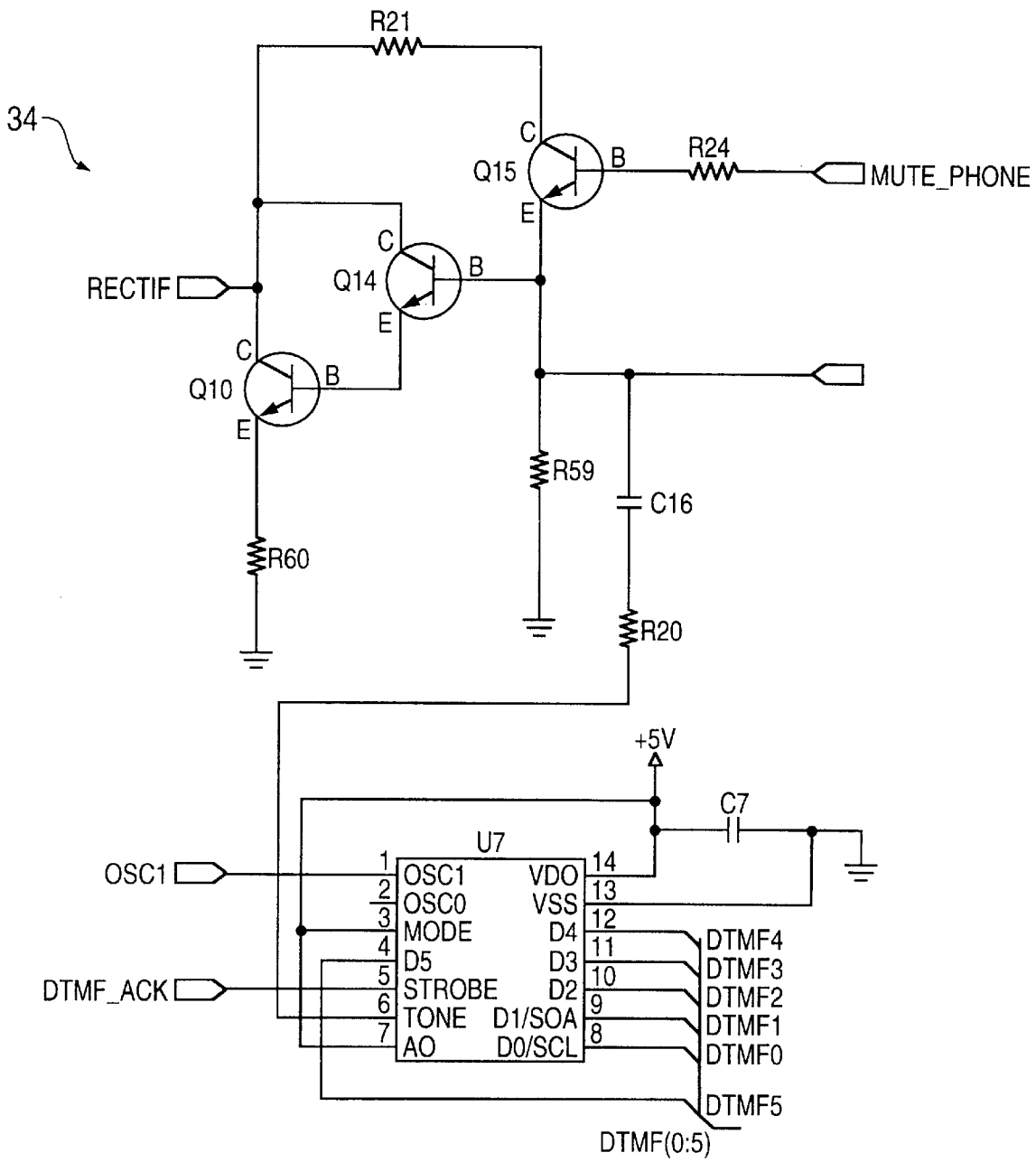

FIG. 5D illustrates a circuit 34 for generation of DTMF signals. A DTMF generator integrated circuit U7 receives a clock signal OSC1, a six bit parallel signal from the microcontroller U3, and a DTMF_ACK input from the microcontroller U3 (FIG. 5C). The DTMF signal is output by the arrangement of transistors Q10, Q14, and Q15, and resistors R21 and R60 to RECTIF and to the telephone line. A transistor Q15 is controlled by the MUTE_PHONE signal from the microcontroller.

Figure 5E:
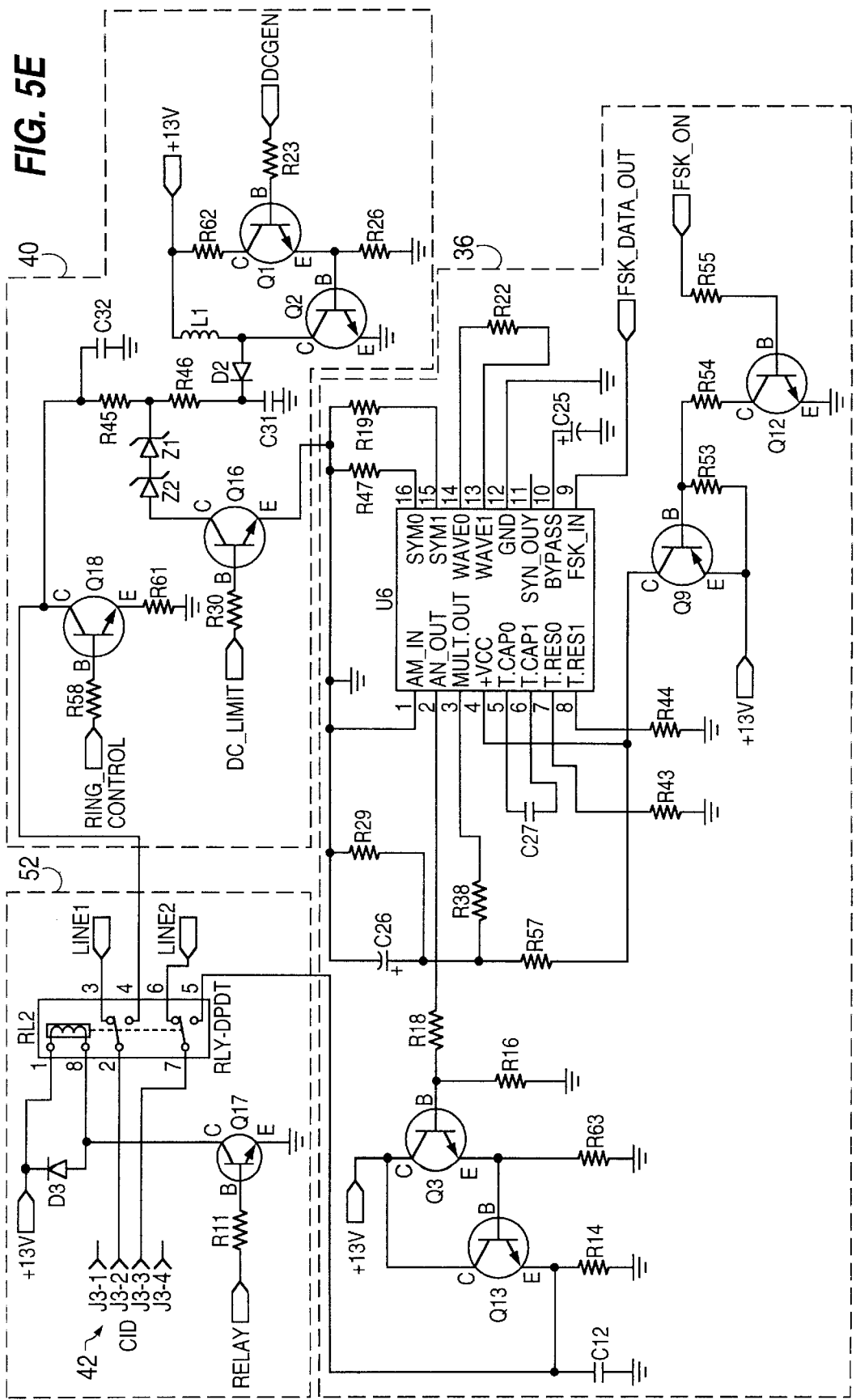

FIG. 5E illustrates circuitry which provides the functionality designated in FIG. 4 as relay circuit 52, ring generator circuit 40, and FSK generator circuit 36. As shown, a relay RL2 selectively connects a line 42 to a CID display device with the subscriber line, designated in the drawing as LINE1 and LINE2 (see FIG. 5A), or with the ring generator circuit 40 and the FSK generator circuit 36. The state of the relay RL2 34 is controlled by the RELAY signal generated by the microcontroller 32 (FIG. 5C). This signal is input to the base of a resistor Q17 via a resistor R11. The collector of transistor Q17 connects with a diode D3 that is connected to a bias DC voltage and a control element of the relay RL2.

The relay is connected at an input 4 to the ring generator circuit 40. This circuit outputs a ring signal to the CID device when activated by the microcontroller 32 with the signal RING_CONTROL. This signal is utilized to selectively turn on a transistor Q16 via base resistor R58. The emitter of the transistor Q16 is connected to ground via resistor R61.

The signal path from the relay RL2 connects via resistor R45 and grounded capacitor C32 with a DC voltage generator subcircuit comprising resistors R46, R62, R26, and R23, a diode D2, an inductor L1, transistors Q1 and Q2, a capacitor C31 and zener diodes Z1 and Z2. This subcircuit receives as an input DCGEN from microcontroller 32.

The ring generator circuit 40 further includes transistor Q16 which is selectively operated by the DC_LIMIT signal supplied from the microcontroller 32 via resistor R30.

Connected in series between the ring generator circuit 40 and the relay circuit 52 is an FSK generator circuit 36. This circuit comprises the following elements connected as shown: resistors R14, R16, R18, R19, R22, R29, R38, R43, R44, R47, R53, R54, and R55; capacitors C12, C25, C26, and C27; transistors Q3, Q9, Q12, and Q13; and function generator SMT circuit U6. In this example the function generator SMT U6 comprises part number XR2206D manufactured by Exar.

The FSK generator circuit 36 receives at input FSK_IN data from the microcontroller 32 designated as FSK_DATA_OUT. The circuit is selectively controlled by an FSK_ON circuit that is connected to resistors Q9 and Q12. Based on these inputs, the function generator outputs FSK data at a terminal AM_OUT onto the signal path to the relay circuit 52.

It should be understood that the configuration shown in FIGS. 5A to 5E represent merely one example of the arrangement shown generally in FIG. 4. Many variations and improvements of will be apparent to those skilled in the art.

Detailed examples of the invention have now been described in fulfillment of the objects set forth above. It should be appreciated that the foregoing embodiment is merely illustrative of the invention. Numerous other arrangements may be devised by those skilled in the art without departing from the spirit and scope of the invention. The invention is thus limited only as set forth by the following claims.

What is claimed is:

1. A converter device for converting caller identification information received from a central office in a first format into a second format that is compatible with a caller identification (CID) display device comprising:

a first line connecting the device to a central office;

a second line connecting the device to at least one CID display device;

off-hook detection means for determining a state of the first line, the state of the first line being one of an off-hook state or an on-hook state;

conversion means for converting caller identification information from the first line from the first format into a second format, the conversion means thereby providing converted caller identification information which is in the second format; and controller means connected to the off-hook detection means for selectively controlling the conversion means so as to convert received caller identification information from the first format to the second format when the first line is in an off-hook state; and means for providing the converted caller identification information to the second line.

2. The converter device of claim 1 wherein the first format is a frequency shift key format utilized with a spontaneous call waiting identification service supported by the central office.

3. The converter device of claim 2 wherein the at least one CID display device is configured to display only caller identification information that is in the second format.

4. The converter device of claim 1 further comprising means for transmitting a ring signal to the at least one CID display device, the ring signal preceding transmission of the converted caller identification information.

5. The converter device of claim 1 wherein the converted caller identification information is buffered until the first line has changed to the on-hook state whereupon the converted caller identification is provided to the first telephone line for detection by at least one additional CID display device connected in parallel with the second line.

6. The converter device of claim 1 wherein caller identification is received from the central office in the second format when the first line is in an on-hook state, and is provided to the at least one CID display device via the second line.

7. The converter device of claim 6, further including a relay controlled by the controller means to selectively provide caller identification information from the central office directly to the second line when the first line is in an on-hook state and to provide caller identification information to the conversion means when the first line is in an off-hook state.

8. The converter device of claim 6 wherein the caller identification information is buffered and then provided to the second line when the first line is in an on-hook state.

9. The converter device of claim 1 wherein the off-hook detection means comprises a first voltage detection circuit connected in parallel with the first line and a second voltage detection circuit connected in series with a third line that connects a telephone device with the converter device.

10. A method of converting caller identification information received over a subscriber line from a central office in a first format into a second format that is compatible with a caller identification (CID) display device, comprising the steps of:

determining a state of the subscriber line, the state of the subscriber line being one of an off-hook state or an on-hook state;

selectively converting caller identification information from the subscriber line from the first format into a second format when the subscriber line is in an off-hook state; and providing the converted caller identification information to the CID display device.

11. The method of claim 10 wherein the first format is a frequency shift key format utilized with a spontaneous call waiting identification service supported by the central office.

12. The method of claim 11 wherein the CID display device is configured to display only caller identification information that is in the second format.

13. The method of claim 10 further the step of transmitting a ring signal to the CID display device prior to transmission of the converted caller identification information.

14. The method of claim 10 wherein the converted caller identification information is buffered until the subscriber line has changed to the on-hook state whereupon the converted caller identification is provided to at least one additional CID display device connected to the subscriber line.

15. The method of claim 10 wherein caller identification is received from the central office in the second format when the subscriber line is in an on-hook state, and is provided to the CID display device.

16. The method of claim 15, wherein a relay is controlled to selectively provide caller identification information from the central office directly to the CID display device when the subscriber line is in an on-hook state and to provide caller identification information for conversion when the subscriber line is in an off-hook state.

17. The method of claim 15 wherein the caller identification information is buffered and then provided to the at least one additonal CID device when the subscriber line is in an on-hook state.

18. The method of claim 10 wherein said step of detecting utilizes a first voltage detection circuit that is connected in parallel with the subscriber line and a second voltage detection circuit that is connected in series with a telephone device that is connected to the subscriber line.

19. A method of displaying caller identification information with a caller identification (CID) display device comprising the steps of:

(a) determining whether a subscriber line to a service provider is in an off-hook state or an on-hook state;

(b) when said subscriber line is in said on-hook state:
receiving an incoming call from said subscriber line, said incoming call including caller identification data in a first format, and
providing said caller identification data in said first format to said CID display device, whereby said caller identification data is displayed; and (c) when said subscriber line is in said off-hook state:
detecting a call alert signal transmitted over said subscriber line,
disconnecting a telephone line to a telephone device from said subscriber line,
acknowledging said call alert signal,
receiving caller identification data in a second format,
converting said caller identification data from said second format to said first format with said converter device;
providing said caller identification data in said first format to said CID display device, whereby said caller identification data is displayed; and
reconnecting said telephone line to said subscriber line.

20. The method according to claim 19, wherein when said subscriber line is in said on-hook state, said caller identification data is directly provided in said first format to said CID display device through a relay.

21. The method according to claim 19, wherein when said subscriber line is in said on-hook state, said caller identification data is decoded from a frequency shift key format data stream by a decoder circuit, buffered, then provided to said CID display device in said first format.

22. The method according to claim 19, further comprising a step of alerting said CID display device with a ring signal prior to providing said caller identification data in said first format to said CID display device.

23. A converter device for displaying caller identification information with a conventional caller identification (CID) display device comprising:

means for determining whether a subscriber line to a service provider is in an off-hook state or an on-hook state;

means for receiving an incoming call from said subscriber line when said subscriber line is in said on-hook state, said incoming call including caller identification data in a first format;

means for providing said caller identification data in said first format to said CID display device when said subscriber line is in said on-hook state, whereby said caller identification data is displayed;

means for detecting a call alert signal transmitted over said subscriber line when said subscriber line is in said off-hook state;

means for disconnecting a telephone line to a telephone device from said subscriber line when said subscriber line is in said off-hook state;

means for said receiving caller identification data in a second format when said subscriber line is in said off-hook state; and means for converting said caller identification data from said second format to said first format and for providing said caller identification data in said first format to said CID display device, whereby said caller identification data is displayed.

24. The device according to claim 23, wherein said means for providing said caller identification data in said first format to said CID display device when said subscriber line is in said on-hook state comprises a relay.

25. The device according to claim 23, wherein said means for providing said caller identification data in said first format to said CID display device when said subscriber line is in said on-hook state comprises a decoder circuit for decoding said caller identification data from a frequency shift key format data stream, buffer means for storing decoded data from said decoder circuit, and means for providing buffered decoded data from said buffer means to said CID display device in said first format.

26. The device according to claim 23, further comprising means for alerting said CID display device with a ring signal prior to providing said caller identification data in said first format to said CID display device.

* * * * *